Feb. 1, 1938.  A. H. J. DE L. SAINT GENIES  2,106,933
REPRODUCTION OF LENTICULAR FILMS
Filed July 25, 1936    2 Sheets-Sheet 1

Feb. 1, 1938. A. H. J. DE L. SAINT GENIES 2,106,933
REPRODUCTION OF LENTICULAR FILMS
Filed July 25, 1936 2 Sheets-Sheet 2

Patented Feb. 1, 1938

2,106,933

UNITED STATES PATENT OFFICE 2,106,933

REPRODUCTION OF LENTICULAR FILMS

Anne Henri Jacques de Lassus Saint Genies, Versailles, France

Application July 25, 1936, Serial No. 92,665
In France August 1, 1935

8 Claims. (Cl. 88—24)

The present invention has for its object methods of copying lenticular films with the aid of devices effecting suitable relative displacements of the original and copy with respect to the copying optical system, which may be of small aperture.

The nature of these displacements and the means for effecting them do not form the object of the present invention; they have been covered by the copending application of the same inventor filed on 2nd May, 1935 under the Serial No. 19,490. The invention has for its object to show the application of these means in the two possible cases of orientation of the goffering of the original, to render independent the angular apertures of the elementary luminous beams of the two films facing each other, with the aid of suitable auxiliary optical systems, to effect the continuous unwinding of the two films during printing, particularly when their gofferings are substantially transverse, and to show a particular arrangement of the printer comprising a copying optical system formed by two coaxial bodies with variable spacing.

It relates more particularly to such application of the additional lenses adapted either to modify the aperture of the elementary beams of the two films or to act on the relative positions of the images of the source and of the zones of convergence of the two films, that these additional lenses always remain parallel to the films and at a constant distance from the latter, whatever the orientation of the goffering of the original.

The other objects and characteristics of the invention will be specified in the description which follows, in the drawings and in the appended claims.

Fig. 1 diagrammatically illustrates the printing system, employing additional optical systems T.

Figure 5:
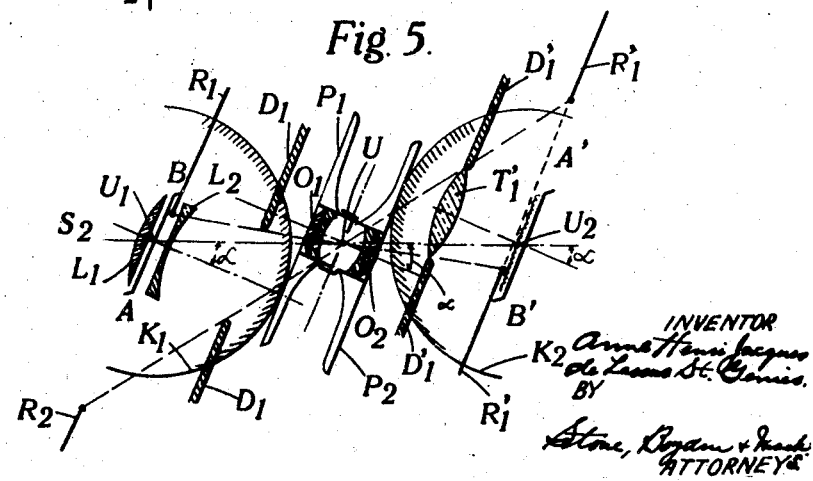
Fig. 5 is a diagram of the complete mechanism according to the invention answering to the case where the principal optical system comprises two coaxial bodies of variable spacing, and comprising certain peculiarities in the kinematic connections.

Referring to Figure 5, AB is the original film and A'B' the copy film, the films being adapted to pass through suitable gates. $O_1$ $O_2$ are two bodies comprising the principal optical copying system. S is a source of light located beyond the original film AB on the optical axis of the optical copying system. D, D' are guards rigid with the gates of the original film and copy film respectively and arranged in the planes of the zones of convergence of the respective films. Each of these guards is provided with a window $d$, $d'$ the periphery of which is equal to the respective zones of convergence. R, R' are screens movable relatively to the films and provided with windows $r$, $r'$ the peripheries of which are equal to the conical projections of the respective zones of convergence on the respective planes of the films from the centre of the principal optical system. The two films AB, A'B' are displaced homothetically relatively to the optical copying system, the planes of said films remaining parallel to one another during this displacement and perpendicular to the axis of the principal optical system whilst the screens R, R' are moved so that their windows remain coincident with the projections of the zones of convergence of the films.

Figure 1:
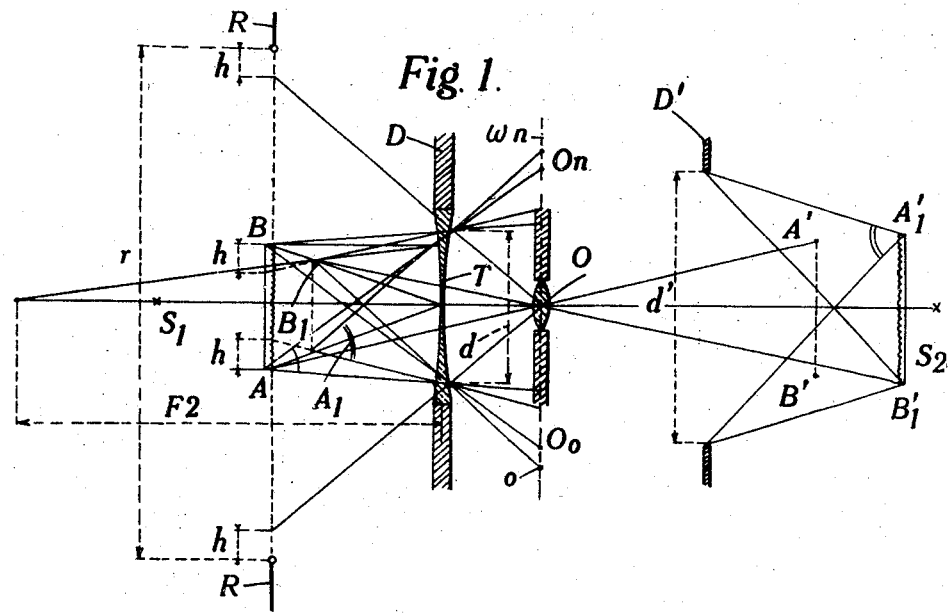

In Fig. 1, AB is the original film, $A'_1B'_1$ the copy film and O the principal copying optical system, which may have a greatly reduced relative aperture. T is a divergent auxiliary optical system, for instance, of focal length $F_2$, giving a reduced virtual image $A_1B_1$ of the original film AB, this image, being received by the principal optical system O, producing on the copy film an image $A'_1B'_1$; the enlargement obtained is a function of the combination O and T chosen. The image A'B' is that which the intervening optical system O alone would furnish.

Owing to the displacements of the optical system O in its plane, accompanied by synchronous displacements of the apertures $d$ and $d'$ in their respective planes, all the beams of the original are transmitted to the copy in accordance with the details given in the copending application mentioned above and in accordance with the details given in the following.

The optical system T, which is divergent in the example chosen, brings onto the copy film a record of the elementary beams of an angular aperture different from the aperture of the original film; in the example under consideration, this aperture is increased. This modification of the angular apertures involves, if desired, gofferings of distinct characteristics for one or the other film; these gofferings differ from one another, for instance, in their pitch, only if the goffered supports are of the same thickness and of the same index. This modification of the aperture also involves, if necessary, a modification of the aperture $r$ of the screens R described in the copending application, by increasing it on each side by the value $h$ for instance. The relative course of the optical system O is, for the same reason, also modified, passing from the value $O_0O_n$ without optical system T for instance, to the value $\omega_0\omega_m$ greater than $O_0O_n$ with this optical system.

It is understood that instead of a divergent additional optical system T on the side of the original, a convergent additional optical system T' (Fig. 5) on the side of the copy, arranged, for instance again, in the aperture $d'$ of the guard D', also leads to an increase of the apertures of the elementary beams recorded by the copy film.

On the contrary, a divergent optical system T' on the side of the copy would lead to a reduction of the aperture of the elementary beams recorded on the copy film, in the same manner as a convergent optical system T on the side of the original. It is obvious that the two means may be combined to produce such a definite effect, for example: divergent additional optical system T on the side of the original, and simultaneously convergent additional optical system T' on the side of the copy, for increasing the apertures of the elementary beams, and vice versa for reducing the apertures etc.

The general copying process described in the copending application is applicable to all types of goffering, but at the cost of certain complications when the gofferings are not simply cylindrical, of parallel directions and facing each other. In the case where the gofferings, cylindrical and facing each other, are not of parallel directions, no complication of kinematic order is to be envisaged and the different elements facing each other are displaced in accordance with the same general principle; it is necessary, however, that the relative linear path of the objective should be oblique to both directions of the gofferings of the films, being established preferably according to one of the bisectrices of these directions such that they are projected one on the other by the copying optical system O.

Figure 2:
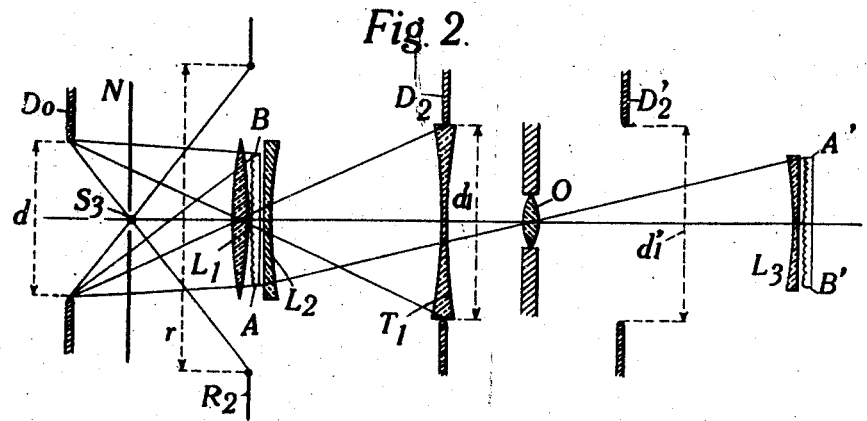
Fig. 2 illustrates the complete arrangement for the case where the original film is directed with its goffering towards the source.

In the case where the gofferings, whatever their types, are turned towards the illuminating source, certain simplifications may be applied and certain precautions taken in accordance with Fig. 2. A guard D of aperture $d$ must be arranged on the side of the source. In the case of positive natural convergence of the axes of the luminous beams of the original, this guard should preferably coincide with the zone of natural convergence, or else an additional spherical or cylindrical optical system $L_1$ arranged in proximity to the film on the side of the source must bring a virtual image of the said guard into coincidence substantially with this zone. In the case of negative natural convergence, this optical system $L_1$ should give a real image $D_1$ of the guard D, more or less diffracted by the film, in its zone of natural convergence. The guard D always remains rigidly connected to the original film. The same applies to the guard $D_1$ if it is materialized.

The finite or infinite distances of convergence of the axes of the elementary beams of the two films facing each other are always in homothetic relation according to the kinematic process explained in the copending application.

The additional optical system $L_1$ preserves its above indicated function in the case where the goffering of the original film is directed towards the optical system O instead of being directed towards the source.

In the two cases of the orientation of the goffering, an additional optical system $L_a$, preferably arranged in proximity to the original film on the side of the optical system O, may be employed for displacing the plane containing the zone of natural convergence (where it is formed), as well as the guard D or its image $D_1$, and for bringing an image of this zone into such a position chosen, on one side or the other of the film, for instance to coincide substantially with the plane containing the diaphragm of the principal copying optical system O.

In the systems described above, the useful relative path of the objective O ensures the exploration, between the remotest limiting rays, of all the elementary beams bearing on the aperture $d$ of the guard D (simultaneously or successively, according to whether the distance separating O from the film AB is equal or not to the distance of natural convergence).

In the case where the goffering of the film AB faces the source, Fig. 2, a slot $S_1$ which plays at any moment the part of a luminous source, remains incessantly aligned with the optical centre of the objective O on the straight line joining the centres of the macroscopic images of the films. $S_1$ takes simultaneously with O (but on the other side of the film AB) a useful relative path between the straight lines bearing on the edges of the aperture $d$ of the guard D and on the edges of the image; these straight lines define the limiting rays of the extreme elementary chambers. The slot $S_1$ then sweeps all the elementary chambers simultaneously and successively, according to whether $S_1$ is in the plane of the guard D or not, whatever the convergence of this film AB, positive or negative, and whether or not use is made of an additional optical system $L_1$ as mentioned above.

If the luminous source is arranged beyond the guard D relatively to the film AB, the sweeping of the elementary chambers is done successively. If the source is in the plane of the guard D, simultaneous sweeping of these chambers takes place. If the source is contained between the plane of the guard D and the film AB, the methodical and successive sweeping of the chambers must be effected by the interposition between the source and the film, in closest proximity to the film, of a movable screen R. The aperture $r$ of the screen R of Fig. 2 is, as in Fig. 1, equal to the projection of the aperture $d$ of the guard D on the plane of this screen; the centre of projection is, in the case of Fig. 2, the centre of the slot $S_1$, while in Fig. 1 it is the centre of the objective O.

In the case where the source is contained between the guard D and the film AB, it is preferably a point source or linear and parallel to the lining of the goffering, or, alternatively, it is desirable that a second screen N for example, contained between R and the source and presenting a slot as shown in Fig. 2, ensures the correct canalization of the luminous rays proceeding from the window $d$ of the guard D.

The diffusing power of the silver image of the original film AB is generally insufficient to prevent the object O from giving, in the region of the copy film, an image of the source more or less diffracted by the goffering of the original; this image may be a cause of disturbances. To overcome this, use may be made, in proximity to the film AB, on the side of the optical system O, of an additional optical system, which may be the optical system $L_2$ (generally a simple spherical or cylindrical lens) in order to construct, in combination, if necessary, with the optical system O, an image of the source S or an image of the zone of convergence containing the source S, in a plane chosen relatively to this optical system O. Preferably, this plane is that of the diaphragm of the optical system O.

An additional optical system $L_3$ in proximity to the copy film may modify the distance of natural convergence which would be acquired by this film remaining blank.

The guards D or $D_1$ on the side of the original and D' or $D'_1$ on the side of the copy are, for one, two or three of them, materialized according to the opportunity or the possibility in the different cases.

If the films to be copied are cinematographic films, if their gofferings are transverse to the films or substantially so, and parallel or substantially parallel to one another, and, finally, if the unwindings of films are of strictly parallel directions, it is possible to observe the copying procedure described above by maintaining immovable in the printer at the same time: the optical system O, the illuminating source and the additional optical system $L_1$, while the films unwind with continuous movements in a speed ratio equal to the enlargement effected. Such a printer is diagrammatically illustrated in Figs. 3 and 4.

Figure 3:
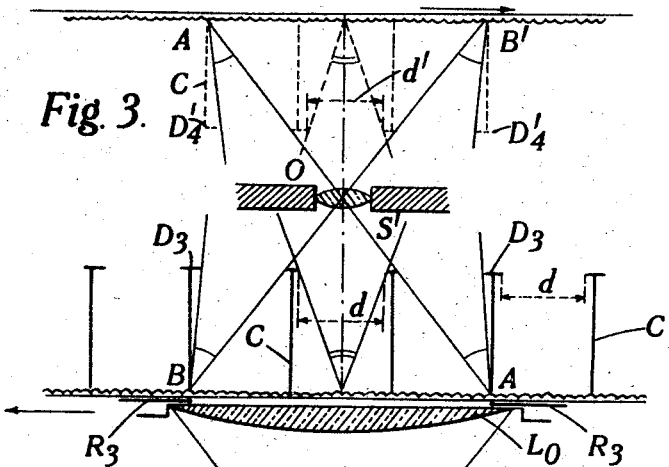
Figs. 3 and 4 illustrate the complete arrangement in the case of continuous unwinding of the films, the distance of convergence of which is finite or infinite.

In Fig. 3, the distance of convergence of the film AB is assumed to be finite. In order that the different apertures d of the guard D equal to one another and adjacent shall not penetrate one another, opaque partitions C, preferably plain and orthogonal to the film and to the guard D, are provided. These partitions separate the successive macroscopic images; they are displaced at the same speed as the film AB in the direction of the arrow, as well as the guard D. As in the general execution of the process, a guard D' homothetic to the guard D, with partitions C' may similarly accompany the copy film A'B' which is displaced in the opposite direction.

The optical system $L_1$, which gives an image S' of S by concentrating the luminous rays on the optical system O, will have a dimension such that it affects at any moment the whole or the part of the film which corresponds to the path necessary for the complete reproduction of any one of the elementary chambers.

Figure 4:
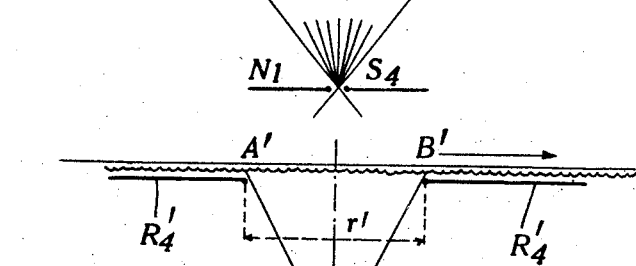
Figure 4:
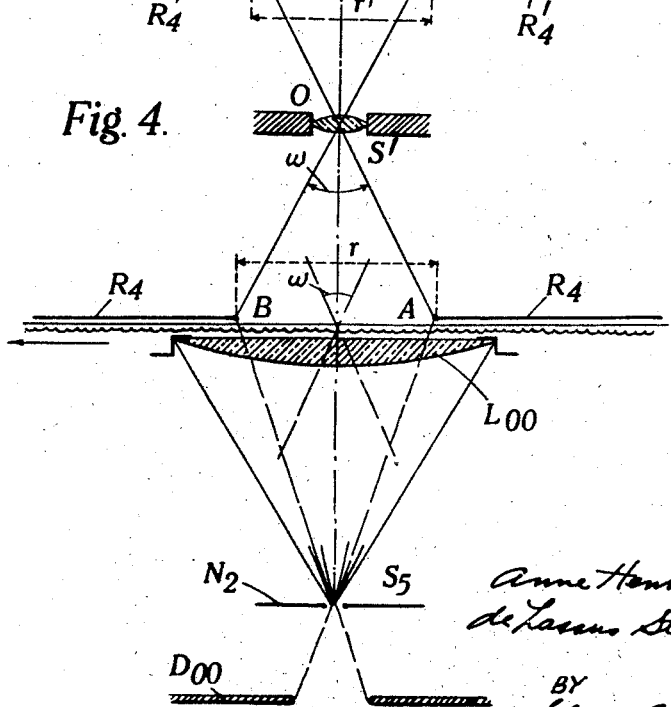

In Fig. 4, it has been assumed that the distance of convergence was infinite. It is the same general arrangement as in the above case. However, matters are simplified with respect to the guard D, which is advantageously replaced by a fixed screen R in close proximity to the film, and the aperture R of which is viewed from the optical system O at the angle $\omega$ corresponding as much as necessary to the aperture of the elementary chambers.

In Fig. 5, there is illustrated an arrangement of the whole of the copying system where the plane (normal to the plane of the figure), which contains the axes $U_1$, $U_2$ and U of suspension of the two supporting frames of the films and of the objective-holder is maintained fixed, these three elements effecting only angular synchronous oscillating movements of the same amplitude.

In order to be able to effect this rotation without displacing the axes $U_1$ and $U_2$ with respect to the axis U, the optical system O is composed of two bodies $O_1$ and $O_2$ of variable spacing and remaining coaxial. At any moment of the rotation of the two frames and of the optical system holder, and, for example, at the moment when this rotation is equal to $\alpha$ starting from the mean position, each of these two bodies of the optical system is then brought to rest at an invariable distance from the film which it directly faces, this distance depending upon the enlargement effected and upon the focal lengths of each of these bodies $O_1$ and $O_2$. This result may be obtained, for example, with the aid of rectilinear and parallel guides $P_1$ and $P_2$ rigidly connected to $O_1$ and $O_2$ and maintained in contact with circular cam discs $K_1$ and $K_2$ having their centres on the axes $U_1$ and $U_2$ of the frames of the films. A diaphragm common to $O_1$ and $O_2$ may be placed approximately in the plane containing the axis U of suspension of the objective-holder and may present the largest aperture which the useful luminous rays can affect at any moment, without, of course, exceeding the relatively small dimensions corresponding to the verification of the general procedure.

The source S of suitable dimensions may be either fixed in the plane containing the three axes of suspension under consideration, or movable in this plane, its displacement being, for example, controlled by a cam disc, so that its image furnished by $L_1$ or by the combination of $L_1$ and $L_2$ remains either in the plane of natural convergence of the film AB, or within or in proximity to the diaphragm of the optical system O, as mentioned above.

The orientation of the goffering of the film AB is, of course, immaterial in this case as in the foregoing cases.

I claim:

1. In a system for copying goffered films with the aid of a principal optical system of small aperture, the plane of its pupil being different from the zone of convergence of the axes of the elementary beams of each of said films, supports for said films, means to give to said films and to said principal optical system synchronous homothetic relative displacements while remaining parallel to one another and perpendicular to the axis of said principal optical system, a source of light placed beyond the original film on the optical axis of said principal optical system which passes, throughout the copying operation, through the centre of said optical system and the centre of the two films, a guard rigidly connected with the support of each film, each provided with a window the periphery of which is equal to said respective zones of convergence, and screens movable relatively to the films in planes near to said films, said screens each having a window the periphery of which is equal to the conical projections of said respective zones of convergence on the respective planes of said films from the centre of said principal optical system, said windows remaining coincident with said respective projections during their movement relative to said films.

2. In a system for copying goffered films with the aid of a principal optical system of small aperture, the plane of its pupil being different from the zone of convergence of the axes of the elementary beams of each of said films, supports for said films, means to give to said films and to said principal optical system synchronous homothetic relative displacements while remaining parallel to one another and perpendicular to the axis of said principal optical system, a source of light placed beyond the original film on the optical axis of said principal optical system which passes, throughout the copying operation, through the centre of said optical system and the centre of the two films, a guard rigidly connected to the support of each film, each provided with a window the periphery of which is equal to said respective zones of convergence, auxiliary optical systems arranged in the window of said guards for modifying the aperture of the elementary light beams emanating from the original film and impinging on the copy film, and screens movable relatively to the films in planes near to said films, said screens each having a window the periphery of which is equal to the conical projections of said respective zones of convergence on the respective planes of said films from the centre of said principal optical system, said windows remaining coincident with said respective projections during their movement relative to said films.

3. In a system for copying goffered films with the aid of a principal optical system of small aperture, the plane of its pupil being different from the zone of convergence of the axes of the elementary beams of each of said films, supports for said films, means to give to said films and to said principal optical system synchronous homothetic relative displacements while remaining parallel to one another and perpendicular to the axis of said principal optical system, a source of light placed beyond the original film on the optical axis of said principal optical system which passes, throughout the copying operation, through the centre of said optical system and the centres of the two films, additional optical systems near to said films for modifying the distances of the zones of convergence of said films, guards each having a window the periphery of which is equal to the respective modified zones of convergence of said films, said guards being arranged in planes coinciding with said modified zones of convergence of said films and being rigidly connected to said film supports, auxiliary optical systems arranged in the window of said guards for modifying the aperture of the elementary light beams emanating from the original film and impinging on the copy film, and screens movable relatively to the films and in planes near to said films, said screens each having a window the periphery of which is equal to the conical projections of said respective zones of convergence on the respective planes of said films from the centre of said principal optical system, said windows remaining coincident with said respective projections during their movement relative to said films.

4. In a system for copying goffered films with the aid of a principal optical system of small aperture, the plane of its pupil being different from the zone of convergence of the axes of the elementary beams of each of said films, supports for said films, fixed and parallel axes passing respectively through the planes of the films and through the centre of symmetry of the principal optical system, means to oscillate said film supports and said optical system about said axes to produce synchronous homothetic displacements of said films relatively to said optical system, two objectives forming said principal optical system and respectively remaining at constant distance from the plane of the corresponding film, two circular cam discs rigidly connected to the fixed axes passing through the planes of said films, a guide rigidly connected with each of said objectives and bearing on said cam discs, a source of light placed beyond the original film on the optical axis of said principal optical system which passes, throughout the copying operation, through the centre of said optical system and the centre of the two films, a guard rigidly connected with the support of each film, each provided with a window the periphery of which is equal to said respective zones of convergence, and screens movable relatively to the films in planes near to said films, said screens each having a window the periphery of which is equal to the conical projections of said respective zones of convergence on the respective planes of said films from the centre of said principal optical system, said windows remaining coincident with said respective projections during their movement relative to said films.

5. In a system for copying goffered films with the aid of a principal optical system of small aperture, the plane of its pupil being different from the zone of convergence of the axes of the elementary beams of each of said films, supports for said films, fixed and parallel axes passing respectively through the planes of the films and through the centre of symmetry of the principal optical system, means to oscillate said film supports and said optical system about said axes to produce synchronous homothetic displacements of said films relatively to said optical system, two objectives forming said principal optical system and respectively remaining at constant distance from the plane of the corresponding film, two circular cam discs rigidly connected to the fixed axes passing through the planes of said films, a guide rigidly connected with each of said objectives and bearing on said cam discs, a source of light placed beyond the original film on the optical axis of said principal optical system which passes, throughout the copying operation, through the centre of said optical system and the centre of the two films, a guard rigidly connected to the support of each film, each provided with a window the periphery of which is equal to said respective zones of convergence, auxiliary optical systems arranged in the window of said guards for modifying the aperture of the elementary light beams emanating from the original film and impinging on the copy film, and screens movable relatively to the films in planes near to said films, said screens each having a window the periphery of which is equal to the conical projections of said respective zones of convergence on the respective planes of said films from the centre of said principal optical system, said windows remaining coincident with said respective projections during their movement relative to said films.

6. In a system for copying goffered films with the aid of a principal optical system of small aperture, the plane of its pupil being different from the zone of convergence of the axes of the elementary beams of each of said films, supports for said films, fixed and parallel axes passing respectively through the planes of the films and through the centre of symmetry of the principal optical system, means to oscillate said film supports and said optical system about said axes to produce synchronous homothetic displacements of said films relatively to said optical system, two objectives forming said principal optical system and respectively remaining at constant distance from the plane of the corresponding film, two circular cam discs rigidly connected to the said fixed axes passing through the planes of said films, a guide rigidly connected with each of said objectives and bearing on said cam discs, a source of light placed beyond the original film on the optical axis of said principal optical system which passes, throughout the copying operation, through the centre of said optical system and the centres of the two films, additional optical systems near to said films for modifying the distances of the zones of convergence of said films, guards each having a window the periphery of which is equal to the respective modified zones of convergence of said films, said guards being arranged in planes coinciding with said modified zones of convergence of said films and being rigidly connected to said film supports, auxiliary optical systems arranged in the window of said guards for modifying the aperture of the elementary light beams emanating from the original film and impinging on the copy film, and screens movable relatively to the films and in planes near to said films, said screens each having a window the periphery of which is equal to the conical projections of said respective zones of convergence on the respective planes of said films from the centre of said principal optical system, said windows remaining coincident with said respective projections during their movement relative to said films.

7. In a system for copying goffered films with the aid of a principal optical system of small aperture, the plane of its pupil being different from the zone of convergence of the axes of the elementary beams of each of said films, supports for said films, means to give to said films and to said principal optical system synchronous homothetic relative displacements while remaining parallel to one another and perpendicular to the axis of said principal optical system, a source of light placed beyond the original film on the optical axis of said principal optical system which passes, throughout the copying operation, through the centre of said optical system and the centres of the two films, additional optical systems near to said films for modifying the distances of the zones of convergence of said films, guards each having a window the periphery of which is equal to the respective modified zones of convergence of said films, said guards being arranged in planes coinciding with said modified zones of convergence of said films and being rigidly connected to said film supports, auxiliary optical systems arranged in the window of said guards for modifying the aperture of the elementary light beams emanating from the original film and impinging on the copy film, screens movable relatively to the films and in planes near to said films, said screens each having a window the periphery of which is equal to the conical projections of said respective zones of convergence on the respective planes of said films from the centre of said principal optical system, said windows remaining coincident with said respective projections during their movement relative to said films, a supplementary guard integral with the film gate of the original film, an image of which given by said additional optical system coincides with the modified position of the zone of convergence of the films, and a screen provided with a slot in coincidence with said optical axis of the principal optical system, said additional optical system giving an image of this slot situated on said principal optical system.

8. In a system for copying goffered films with the aid of a principal optical system of small aperture, the plane of its pupil being different from the zone of convergence of the axes of the elementary beams of each of said films, supports for said films, means to give to said films and to said principal optical system synchronous homothetic relative displacements while remaining parallel to one another and perpendicular to the axis of said principal optical system, a source of light placed beyond the original film on the optical axis of said principal optical system which passes, throughout the copying operation, through the centre of said optical system and the centres of the two films, a guard rigidly connected with the support of each film, each provided with a window the periphery of which is equal to said respective zones of convergence, screens movable relatively to the films in planes near to said films, said screens each having a window the periphery of which is equal to the conical projections of said respective zones of convergence on the respective planes of said films from the centre of said principal optical system, said windows remaining coincident with said respective projections during their movement relative to said films, the lenticulations of the two films being transversal to their direction of displacement, and an additional optical system provided near to the original film, between said film and said light source, giving an image of said light source on said principal optical system, said additional optical system being located in said window of said screen movable relatively to the films which displace themselves at constant speeds.

ANNE HENRI JACQUES
DE LASSUS ST. GENIES.